United States Patent
Mears et al.

[11] Patent Number: 6,041,362
[45] Date of Patent: *Mar. 21, 2000

[54] METHOD AND SYSTEM FOR INTEGRATING DISPARATE INFORMATION TECHNOLOGY APPLICATIONS AND PLATFORMS ACROSS AN ENTERPRISE

[75] Inventors: Randall F. Mears, Plano; Brad L. Rucker, Allen, both of Tex.

[73] Assignee: Electronics Data Systems Corporation, Plano, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/546,390

[22] Filed: Oct. 20, 1995

[51] Int. Cl.⁷ .................................................. G06F 17/30
[52] U.S. Cl. .......................................... 709/300; 709/250
[58] Field of Search ........................... 395/800; 709/300, 709/250, 219

[56] References Cited

U.S. PATENT DOCUMENTS

| | | | |
|---|---|---|---|
| 4,623,964 | 11/1986 | Getz | 709/300 |
| 5,297,249 | 3/1994 | Bernstein | 395/156 |
| 5,305,456 | 4/1994 | Boitana | 395/700 |
| 5,475,836 | 12/1995 | Harris | 395/600 |
| 5,539,904 | 7/1996 | Brauns | 395/600 |
| 5,544,316 | 8/1996 | Carpenter | 709/300 |
| 5,550,968 | 8/1996 | Miller | 395/157 |
| 5,553,239 | 9/1996 | Heath | 395/187.01 |
| 5,634,127 | 5/1997 | Cloud | 709/300 |
| 5,737,395 | 4/1998 | Irribarren | 379/88 |
| 5,742,762 | 4/1998 | Scholl | 395/200.3 |
| 5,742,845 | 4/1998 | Wagner | 395/831 |
| 5,745,754 | 4/1998 | Lagarde | 395/615 |
| 5,892,946 | 4/1999 | Worster | 395/680 |

*Primary Examiner*—Eric Coleman
*Attorney, Agent, or Firm*—L. Joy Griebenow; Baker & Botts L.L.P.

[57] ABSTRACT

A method and system for integrating disparate information technology applications and platforms across an enterprise provides a web client interface that associates with an enterprise network. Connecting with the web client through the network is the Hyper-Text Transfer Protocol (HTTP) server that includes a Common Gateway Interface (CGI) interface program for augmenting the integration of the disparate applications and platforms via remote and local applications execution. The HTTP server is specific to the particular enterprise for specifically dealing with application servers and information servers and further for collecting information and gathering it together into a form that is then displayed on the web client.

20 Claims, 2 Drawing Sheets

METHOD AND SYSTEM FOR INTEGRATING DISPARATE INFORMATION TECHNOLOGY APPLICATIONS AND PLATFORMS ACROSS AN ENTERPRISE

TECHNICAL FIELD OF THE INVENTION

The present invention relates to a method and system for obtaining, processing, and displaying information and, more particularly, to a method and system for integrating disparate information technology applications and platforms across an enterprise that permits remote application execution and information delivery, local application execution from a remote application library, and a variety of other services through a single user interface.

BACKGROUND OF THE INVENTION

Corporations have many disparate new and old or existing applications that generally have been developed as stand-alone functions. Information technology systems, for example, may have been written by or for the accounting department, the shipping department, or the order entry group and often have different designs and user interfaces, different applications, and run on different platforms. They also are often stored in many different, and different types of, data bases.

The stand-alone functions can require different interfaces and login identifiers for each function, the use of multiple network navigation functions (i.e., searching for the applications), multiple menuing systems and specific knowledge of each application in order to know when and how to use them. This results in "islands of information" in any enterprise. The consequences of this can be lost opportunity, reinvention and rework, and unproductive time spent searching for data and other information about the enterprise and its human, tangible, and intangible resources and assets.

One of the principle tasks of system integration is to integrate disparate databases, applications, and platforms into one system that is accessible to desired enterprise employees. Almost without exception, in these situations many established software systems that may have already been installed are replaced by systems that fit within the integrator's new integration scheme. Presently, it is not possible, without rewriting or replacing all the existing systems, to integrate the different applications and platforms inside the corporation. Unfortunately, when this occurs, there is the need to retrain the employees who used the previously existing systems.

With the conventional methods of integrating the need for different software systems to be useable by different users for many different applications, many other limitations also exist. For example, the existing enterprise applications and platforms are not network connectable using the various protocols, such as TCP/IP that permit communication on networks. In addition, the many applications and platforms that an enterprise uses in their present state require different and separate passwords.

Moreover, even though a system integrator may provide new software systems for an enterprise, there is yet a great deal of information on different databases in different formats that either does not become incorporated into the system or that does not become usable in a common or integrated format. Also, different interfaces are necessary to integrate the different applications and the different platforms. In fact, even with the best of system integration products and services, there is no ability to provide to employees and other users a single comprehensive user interface that provides an automatically updated, up-to-the-minute view of the information and processes occurring within the enterprise across its many different applications and platforms.

Consequently, there is a need for a method and system that permits use of the numerous applications and data, including platforms that are disparate.

There is a need for a method and system that permits a user to avoid the unnecessary complexity and frustration of having to logon to every single system of a wide-area or other network, with a separate password for each logon operation.

There is the further need for a user interface providing a single menu that permits authorized users to access all information that an entire corporation holds.

There is the need for a method and system that permits local application execution from a remote application library, even in the instance that the remote application library includes functional, structurally, and substantively different data bases.

There is yet a further need for a method and system that provides users the ability to interface numerous intelligent and non-intelligent interfaces at the enterprise level and execute different applications on multifarious platforms.

SUMMARY OF THE INVENTION

In accordance with the present invention, a method and system for integrating disparate information technology applications and platforms across an enterprise is provided that substantially eliminates or reduces disadvantages and problems associated with previously developed systems for integrating disparate applications and platforms.

One aspect of the present invention provides a web client interface that associates with an enterprise network where the web client comprises a computer software application. Connecting through the enterprise network and with the web client is an application integrating server that includes a graphical interface program for augmenting the integration of the disparate applications and platforms by remotely and locally executing applications. The applications integrating server, which is specific to the particular enterprise specifically interfaces and integrates with the disparate application and information servers and collects and gathers information for display in an integrated form through the comprehensive graphical interface.

One embodiment of the applications integrating server is a Hyper-Text Transfer Protocol (HTTP) server that includes a form that is displayed to the web client in an Hyper-Text Markup Language (HTML) document. As a result of the user providing information that the form uses, the HTTP server causes the execution of a graphical interface script that contains logical instructions for sending a request to execute a transaction to the various application servers. The appropriate application server or servers respond to the request to update affected information on associated databases, by addressing the application integrating server and providing the results of the initiated activity. The HTTP server then builds an HTML document and returns the document to the web client. The user may then respond, as desired, to the HTML document, by requesting more or different information from the different applications and platforms of the enterprise.

The present invention provides network capable software for the application integrating server, such as an Internet World Wide Web browser system, to create a single point of interface for the user to access and communicate with any sub-organization of the enterprise. By using a networked set of application integrating servers that interface and control the disparate application systems, documents, presentations, source code programs, software objects and other digitally stored information all within the enterprise, the present invention provides the methodology and system for communicating between the disparate servers within the enterprise. With the present invention, the user has the ability to send and receive requests for information and transactions that interface all types of applications, technical libraries, object libraries, code libraries, document repositories, discussion databases, and information databases within the enterprise.

Accordingly, the present invention provides the user with a single "window" into the entire enterprise. The present method and system permit the user to browse through multiple applications from a single interface, rapidly share information, and update and disseminate the information inside the enterprise. The present method and system permit the enterprise to logically organize information to permit employees and other users to search, download and use the information by topic, type of information (e.g., documents, presentations, and interactive applications, etc.), or by business function or other structures, as desired.

Another especially attractive feature of the present invention is that it permits "mining" old applications that heretofore were difficult or impossible to access and use. Information of significant value that may not have been used because of these difficulties becomes useable as a result of the present invention. This results in a more comprehensive view of the enterprise than has been possible previously. Multimedia applications, for example, are made simple as a by-product of the present invention. This is because, through the single integrated user interface, the many images and audio tracks that a user may desire for multimedia presentations and that an enterprise may have on various different applications and platforms now becomes readily available to the user.

In fact, in a manner that was previously not possible, the present invention permits the user to "move" from department to department across the enterprise using the single integrated user interface. The present invention, in effect, provides a single point of contact for personnel seeking information and, therefore, becomes a "rallying point" for all new applications.

Other technical advantages of the present invention include the fact that employees, who may have been trained on a prior or existing application or interface, can use the single interface without requiring additional training on the new and separate applications. The present invention initiates transactions from the integrated interface to operate applications or without the user's knowledge.

Also, security of the many different applications and different platforms of an enterprise is simplified with the present invention. When a user desires information that initiates a given application or requires access to a particular platform, the present invention sends the user's password to the appropriate applications or platform behind the scenes. Accordingly, the present invention provides a single homogenous interface for all of the departments within an enterprise.

BRIEF DESCRIPTION OF THE DRAWINGS

For a more complete understanding of the present invention and the advantages thereof, reference is now made to the following description which is to be taken in conjunction with the accompanying drawings in which like reference numerals indicate like features and wherein.

DETAILED DESCRIPTION OF THE INVENTION

Preferred embodiments of the present invention are illustrated in the FIGUREs like numerals being used to refer to like and corresponding parts of the various drawings.

The present invention provides a web client interface that connects through an enterprise network to an application integrating server such as an Hyper-Text Transfer Protocol (HTTP) server. The HTTP server includes a graphical interface such as that provided by a Common Gateway Interface (CGI) interface program for integrating the disparate applications and platforms of the enterprise via remote and local applications execution. The HTTP server may be specific to the particular enterprise for specifically integrating and interfacing with application servers and information servers and further for collecting and gathering information together to display it in a desired form on the CGI interface.

One embodiment of the HTTP server may include a form that is displayed in an Hyper-Text Markup Language (HTML) format. The user provides information that the form requires, and, in response, the HTTP server causes the execution of CGI script that may contain the logic and other instructions for sending a request that executes a transaction to an addressed and interfaced application server. The particular application server then may respond to the request, update information relating to that user's request by addressing the particular application server, and providing the results of the initiated activity. The HTTP server then can build a new or supplemental existing HTML document that the HTTP server returns to the web client. The user may then respond, as desired, to the built document by, for example, seeking more or different information from the different applications and platforms of the enterprise.

Implementing the present architecture includes the steps of identifying all the components to make this work. The enterprise network is specific to the particular enterprise according to the various disparate applications and platforms within the enterprise. The HTTP server includes a CGI interface program that augments integration via remote and local application execution. The CGI interface is unique to the particular enterprise and specifically deals with the particular application servers or information servers of the enterprise to collect the information, gather it together, and assemble it in a form that the user interface displays.

The CGI script contains the logic and instructions for sending a request for a transaction to an appropriate application server and for receiving a response back from that application server. The CGI interface program may be written in C, PERL, or some other appropriate computer language that permits the formation of logic and instructions for the particular application server.

Figure 1:
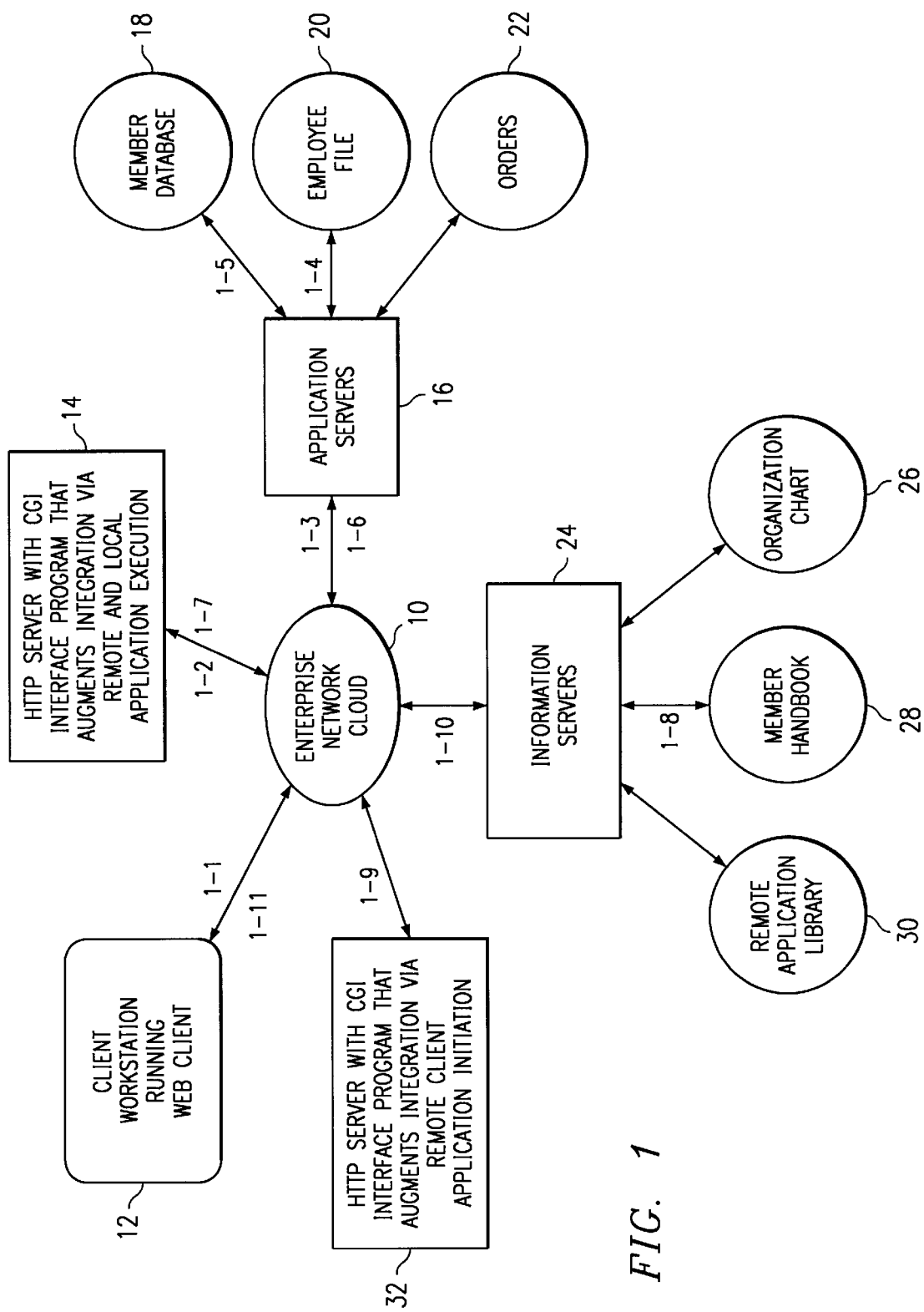
FIG. 1 shows one embodiment of the present invention as applied to a single user interface for disparate applications.
Figure 2:
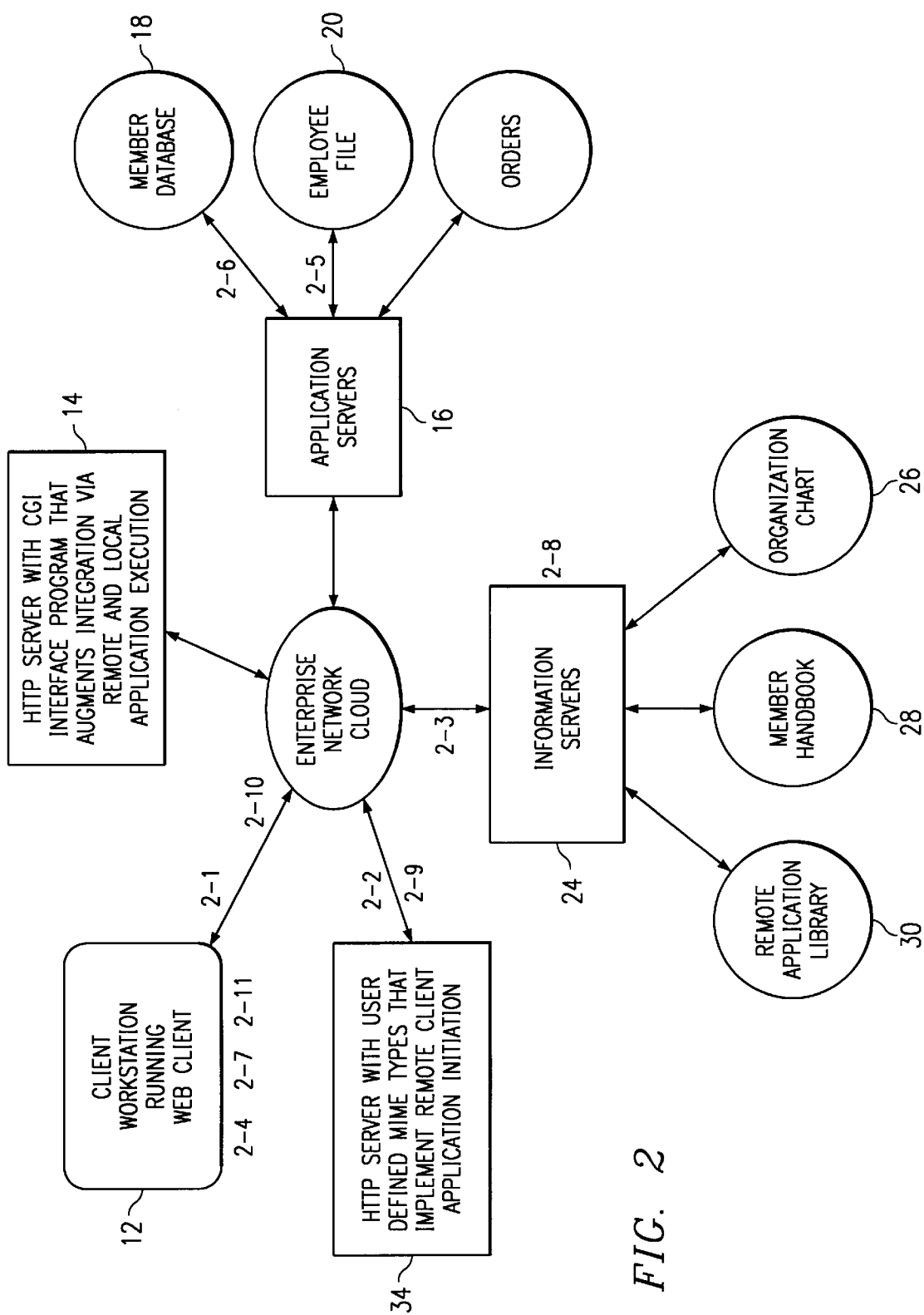
FIG. 2 depicts another embodiment of the present invention as applied to a single user interface for disparate applications.

FIGS. 1 and 2 illustrate the operation of one embodiment of the present invention wherein enterprise network 10 interfaces with client workstation 12 that operates on the web client where the web client comprises a computer software application. It should be understood that client workstation 12 is used by a user or operator, and the web client is run by client workstation 12 for use by the user or operator. HTTP server 14 includes a CGI interface program that augments integration via remote and local application execution and connects with enterprise network 10. Application servers 16 connects to enterprise network 10 and includes numerous and disparate application servers, such as an application server for member database 18, an application server for employee file 20, and an application server for order file and program 22. Also connecting to enterprise network 10, information servers 24 may include numerous and disparate information servers, such as information servers for organization charge data file 26, member handbook 28, and remote application library 30. In the example of FIG. 1, enterprise network 10 also connects or has an interface with HTTP server 32.

The integrated application that FIG. 1 illustrates includes an example of disparate applications across an enterprise. In this example, at step 1-1, the user at client workstation 12 fills in the HTML form to request information relating to membership of an individual and submits the form by clicking a SUBMIT button or function key at client workstation 12. Step 1-2 shows that the HTML form is received by HTTP server 32 and an Add Member function of the CGI interface program indicated in the HTML form is to be executed.

At step 1-3, the Add Member function of the CGI interface program connects to application servers 16 and the Add Member Transaction is initiated by application server 16. The Add Member Transaction, at step 1-4, queries the employee database of employee file 20 to validate and edit the information from the employee database in response to the request. At step 1-5, the Add Member Transaction ensures that the employee is not currently a member and then adds the employee to membership database 18.

Code indicating a successful transaction is returned at step 1-6 to the Add Member CGI program currently executing on the HTTP Server. The Add Member CGI program, at step 1-7, sends a request to Information Servers 24 updating member handbook 28 to include the new member in its member directory. Member handbook 28 is an online file that may be in a word processing format such as MS Word®, a trademark of Microsoft Corp., or WordPerfect®, a trademark of Novell, Inc.

At step 1-8, member handbook 28 is updated by an Update Member Handbook Application through information server 24. The HTML Version of the member directory, which may reside on yet another HTTP Server is also updated at step 1-9, by the update member handbook application. There are at least two ways to update member handbook 28. One way is to have the server access the database directly and return the results. One of the many possible alternatives to the above method to update addresses the situation of HTTP server 32 not having the ability or clearance to go to member database 18, for one reason or another. An alternative approach, in this instance, would be to build an HTML tree that contains the entire member database 18.

At step 1-10, code indicating a successful transaction is returned to the add member CGI program along with the specification of the URL for the current Member Handbook. This results in the construction of an HTML page that indicates the successful status of the request and contains a hotlink to the new Member Handbook. The resulting HTML page is then sent, at step 1-11, to client workstation 12 where it is displayed. The display notifies the user that his application was successful and gives him a hot link to the updated Member Handbook 28. The user can then initiate viewing of the new Member Handbook by pressing the associated hotlink.

In FIG. 2, another example appears of implementing the present embodiment. The distinction between FIGS. 1 and 2 is that HTTP server 32 of FIG. 1 is replaced by HTTP server 34 of FIG. 2 that includes user-defined mime types that implement remote client application initiation. At step 2-1, a user at client workstation 12 clicks on an HTML link for New Memberships. The HTTP server 14 then sends the requested document, which is defined as a user mime type, at step 2-2, and executes a custom helper application that is loaded on client workstation 12, which shall be herein referred to as a Launch Manager. The triggering document itself contains the actual name of the program required to process the new memberships and add member transaction applications.

In step 2-3, the Launch Manager, executing on client workstation 12 and using the program name specified in the triggering document, connects to information server 24 and requests a copy of the executable code for the add member transaction. The Add Member Transaction application is executed, at step 2-4, on client workstation 12 to display a form that the user fills out and initiates the Add request. At step 2-5, the Add Member Transaction application insures that the employee is on the employee database and that the entered information is valid by directly accessing the employee file 20. The Add Member Transaction application insures that the employee is not currently on the membership database, at step 2-6, and then adds the employee to the membership database. Then, at step 2-7, the Add Member Transaction sends a request to the Information Server to update the particular version of the Online Member Handbook to include the new member in its member directory.

Member Handbook 28 is updated, at step 2-8, by the Update Member Handbook Application. The HTML Version of the Member Database, residing on yet another HTTP Server is also updated, at step 2-9, by the Update Member Handbook Application within information server 24. At step 2-10, a code indicating success is returned to the Add Member Transaction program that runs on client workstation 12 along with the word processing copy of the Member Handbook 28.

The Add Member Transaction on client workstation 12 displays a success message and executes MS Word®, WordPerfect®, or another word processing system with new Member Handbook 28. Once the user acknowledges, the Add Member Transaction completes and transfers the focus to the web client window at client workstation 12. These events occur at step 2-11.

Note that in FIG. 1 and 2 configurations, security in the many different applications and different platforms is simplified. The password gets passed to the applications behind the scenes. The system passes the password to the different applications and platforms.

The present invention solves the security problem in the following way. The user may log in and enter a single password. That encrypted password, then, may be passed on by client workstation 12 to all the platforms for the transactions that are being executed behind the scenes. The surrogate transactions that have been written inside the interface are able to retrieve that information from the file. In other words, either an initial transaction or response transaction would carry that password on into those different systems. This is separate and distinct from the security integration problems that exist when using disparate applications.

These different systems each represent a different interface without specifically identical integration to the user. The present embodiment permits the user to have and use the same password with all the different applications and platforms with the present embodiment managing it for the user. With the present embodiment, it is even possible to have different passwords in different places with a simple table lookup for each user at client workstation 12 for initiating the appropriate applications and accessing the platforms to respond to particular requests for information.

Although the invention has been described in detail herein with reference to the illustrative embodiments, it is to be understood that this description is by way of example only and is not to be construed in a limiting sense. It is to be further understood that numerous changes in the details of the embodiments of the invention and additional embodiments of the invention, will be apparent to, and may be made by, persons of ordinary skill in the art having reference to this description. It is contemplated that all such changes and additional embodiments are within the spirit and true scope of the invention as claimed below.

What is claimed is:

1. A system for connecting a web client to an enterprise network having a plurality of disparate applications and platforms, comprising:

a web client;

a predetermined information interface form for interfacing the web client with an enterprise network; and an application server that connects the web client to the enterprise network, the application server operable to initiate the updating of information in a first disparate application in response to information received from a second disparate application.

2. The system of claim 1, wherein:

the application server comprises a Hyper-Text Transfer Protocol server; and the predetermined information interface form comprises a Hyper-Text Markup Language document.

3. The system of claim 1, wherein the application server further comprises an interface program operable to:

receive a request generated by the web client for information from the disparate applications and platforms;

retrieve the requested information from at least two of the disparate applications and platforms; and integrate the requested information into the predetermined information interface form for delivery to the web client.

4. The system of claim 3, wherein the interface program further comprises instructions for building a Hyper-Text Markup Language document that integrates the requested information into the predetermined interface form for delivery to the web client.

5. The system of claim 3, wherein the application server comprises a Hyper-Text Transfer Protocol server having a Common Gateway interface program operable to integrate the requested information into the predetermined information interface form for delivery to the web client.

6. The system of claim 1, wherein the disparate applications comprise a member database application, an employee file application, and an order file and program application.

7. An application server for connecting a web client to an enterprise network having a plurality of disparate applications and platforms, the application server having an interface program comprising:

first instructions for receiving a request generated by the web client for information from the disparate applications and platforms; and second instructions for initiating the updating of information in a first disparate application in response to information received from a second disparate application.

8. The application server of claim 7, further comprising:

third instructions for retrieving the requested information from at least two of the disparate applications and platforms; and fourth instructions for integrating the requested information into a predetermined information interface form for delivery to the web client.

9. The application server of claim 7, wherein the interface program comprises a Common Gateway interface program.

10. The application server of claim 8, wherein:

the application server comprises a Hyper-Text Transfer Protocol server; and the predetermined information interface form comprises a Hyper-Text Markup Language document.

11. The application server of claim 8, wherein the third instructions comprise third instructions for retrieving the requested information from the disparate applications and platforms by using remote and local applications execution.

12. The application server of claim 8, wherein the third instructions comprise third instructions for:

initiating a remote application execution on at least one of the disparate applications;

retrieving the requested information resulting from the remote application execution; and processing the requested information by initiating a local application execution on the application server.

13. The application server of claim 8, wherein the fourth instructions comprise fourth instructions for building a Hyper-Text Markup Language document that integrates the requested information into the predetermined interface form for delivery to the web client.

14. A method for connecting a web client to an enterprise network having a plurality of disparate applications and platforms, comprising the following steps performed at an application server:

receiving a request generated by the web client for information from the disparate applications and platforms; and initiating the updating of information stored in a first disparate application in response to information received from a second disparate application.

15. The method of claim 14, wherein:

the application server comprises a Hyper-Text Transfer Protocol server; and the predetermined information interface form comprises a Hyper-Text Markup Language document.

16. The method of claim 14, further comprising:

retrieving the requested information from at least two of the disparate applications and platforms; and integrating the requested information into a predetermined information interface form for delivery to the web client.

17. The method of claim 16, wherein the step of retrieving comprises retrieving the requested information from the disparate applications and platforms using remote and local applications execution.

18. The method of claim 16, wherein the step of retrieving comprises retrieving the requested information from the disparate applications and platforms using remote and local applications execution of a Common Gateway interface program residing on the application server.

19. The method of claim 16, wherein the step of retrieving comprises:

initiating a remote application execution on at least one of the disparate applications;

retrieving the requested information resulting from the remote application execution; and processing the requested information by initiating a local application execution on the application server.

20. The method of claim 16, wherein the step of integrating the requested information comprises building a Hyper-Text Markup Language document that integrates the requested information into a predetermined interface form for delivery to the web client.

* * * * *